(12) United States Patent
Grazioso

(10) Patent No.: US 7,611,302 B2
(45) Date of Patent: Nov. 3, 2009

(54) APPARATUS FOR MUTUALLY STABLY CONNECTING PROFILED ELEMENTS

(75) Inventor: Luca Grazioso, Frazione Sant'Atto (IT)

(73) Assignee: Corradi S.p.A., Bologna (IT)

( * ) Notice: Subject to any disclaimer, the term of this patent is extended or adjusted under 35 U.S.C. 154(b) by 63 days.

(21) Appl. No.: 11/808,949

(22) Filed: Jun. 14, 2007

(65) Prior Publication Data
US 2008/0072517 A1 Mar. 27, 2008

(30) Foreign Application Priority Data
Sep. 26, 2006 (IT) .......................... BO2006A0657

(51) Int. Cl.
*F16B 7/06* (2006.01)
(52) U.S. Cl. .......................... 403/43; 403/295; 403/403
(58) Field of Classification Search ............ 403/43–48, 403/295, 374.3, 402, 403, 382
See application file for complete search history.

(56) References Cited

U.S. PATENT DOCUMENTS 1,878,055 A * 9/1932 Wittliff ........................ 403/48

FOREIGN PATENT DOCUMENTS

| FR | 2 438 189 A | 4/1980 |
|---|---|---|
| WO | WO 2004/003326 A | 1/2004 |

* cited by examiner

*Primary Examiner*—Victor MacArthur
(74) *Attorney, Agent, or Firm*—Modiano & Associati; Albert Josif; Daniel J. O'Byrne

(57) ABSTRACT

An apparatus for mutually stably connecting profiled elements, comprising inserts which are adapted for stably accommodating, each within a respective profiled element, units for anchoring to the contoured ends of the inserts which are directed toward the outside of each profiled element, and a tension member whose ends are associated with the units.

11 Claims, 3 Drawing Sheets

APPARATUS FOR MUTUALLY STABLY CONNECTING PROFILED ELEMENTS

The present invention relates to an apparatus for mutually stably connecting profiled elements.

BACKGROUND OF THE INVENTION

In the provision of structures of various kinds, two converging structural elements frequently have to be coupled to each other.

Currently, locking elements are used which wrap around the converging heads of the elements, keeping them in the correct mutual position: in practice, by mutually clamping the structural elements, a very effective and stable connection is obtained, which however can be aesthetically poor.

Further, such locking elements are adapted for the mutual coupling of structural elements only at predefined and limited angles of incidence.

If it is necessary to couple structural elements which are incident at nonstandard angles, it is common practice to use connecting plates (in practice, plates which must be superimposed on both elements and are fixed by means of screws or the like to the surface of said elements) or threaded connecting means or the direct welding of the two mutually proximate facing ends.

These solutions are highly versatile and allow to adapt them perfectly to any type of joint.

However, the use of plates and/or threaded means leads to the provision of an aesthetically poor product, which has surfaces of discontinuity which can entail deposits of dirt (dust, et cetera) and possible rainwater infiltrations.

The solution that provides for welding leads to the provision of a product which is qualitatively and aesthetically ideal: however, the costs for welding in place (during the assembly of the structure) are extremely high and make this solution inapplicable for most low-cost small structures.

In particular, these solutions are of practical interest in outdoor structures, such as pergolas, covering canopy structures and the like, and structures constituted by generally metallic profiled elements which constitute beams and columns.

SUMMARY OF THE INVENTION

The aim of the present invention is to provide an apparatus for mutually stably connecting profiled elements which is adapted to couple profiled elements which are mutually incident at any angle.

Within this aim, an object of the present invention is to provide an apparatus for mutually stably connecting profiled elements which is simple and quick to assemble and disassemble.

Another object of the present invention is to provide an apparatus for mutually stably connecting profiled elements which has a low cost, is simple to provide in practice, and safe in application.

This aim and these and other objects which will become better apparent hereinafter are achieved by the present apparatus for mutually stably connecting profiled elements, characterized in that it comprises inserts which are suitable for stably accommodating, each within a respective profiled element, units for anchoring to the contoured ends of said inserts which are directed toward the outside of each profiled element, and a tension member whose ends are associated with said units.

BRIEF DESCRIPTION OF THE DRAWINGS

Further characteristics and advantages of the invention will become better apparent from the following detailed description of a preferred but not exclusive embodiment of an apparatus for mutually stably connecting profiled elements, illustrated by way of nonlimiting example in the accompanying drawings, wherein.

DESCRIPTION OF THE PREFERRED EMBODIMENTS

Figure 1:
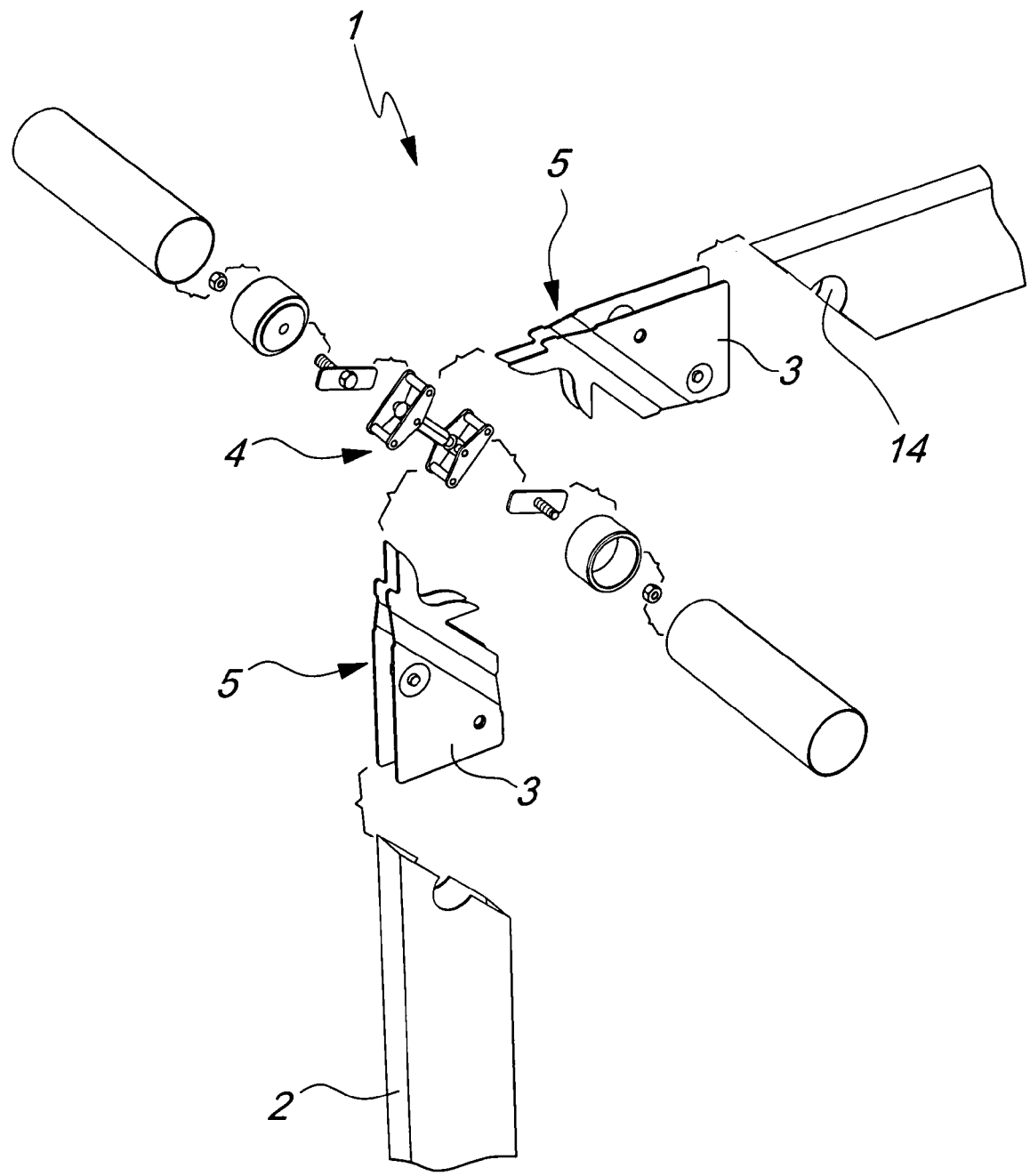
FIG. 1 is an exploded perspective view of an apparatus for mutually stably connecting profiled elements according to the invention.
Figure 2:
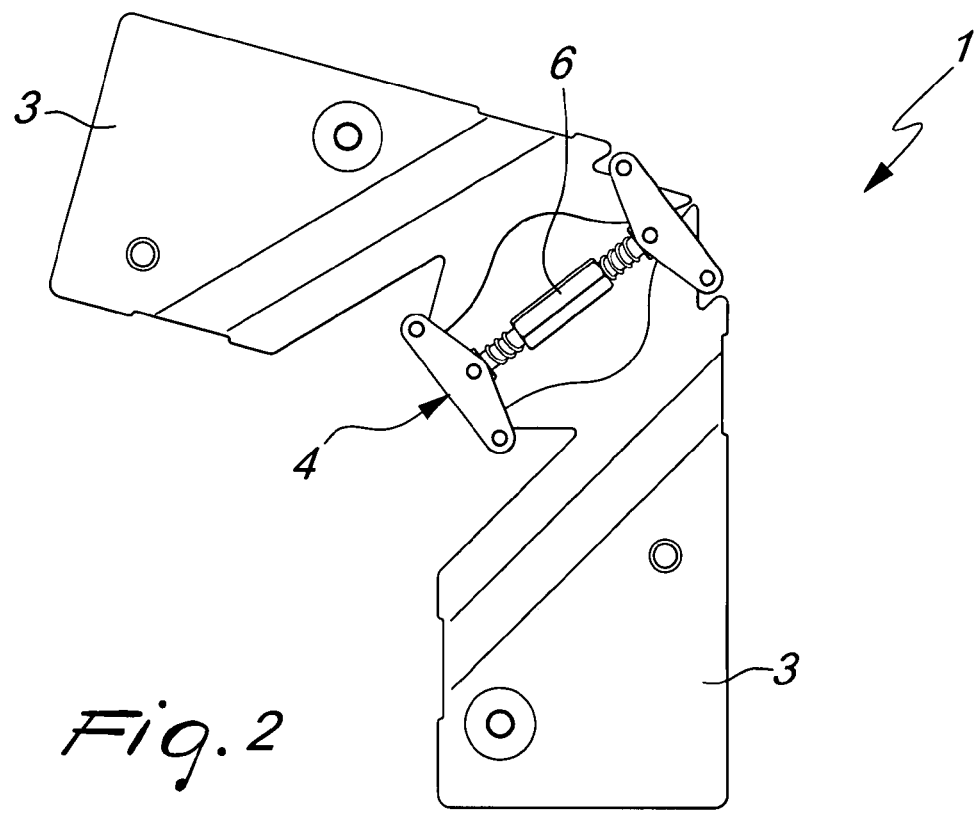
FIG. 2 is a side view of an apparatus for mutually stably connecting profiled elements according to the invention, with profiled elements which are incident at one of the possible angles.
Figure 3:
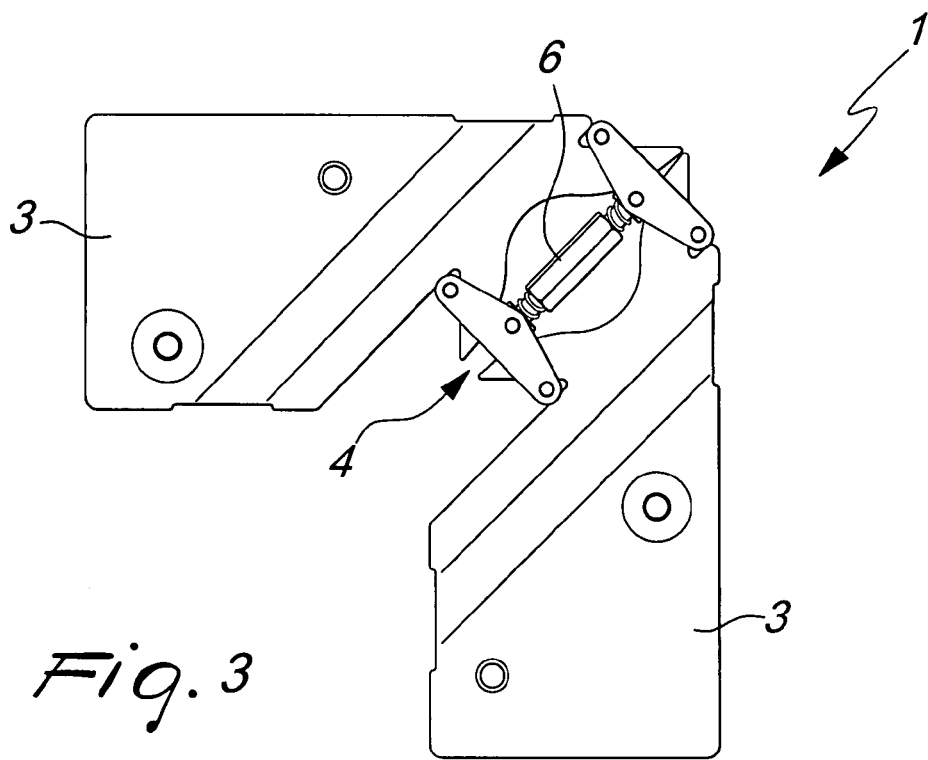
FIG. 3 is a side view of an apparatus for mutually stably connecting profiled elements according to the invention, with profiled elements which are incident at another possible angle.
Figure 4:
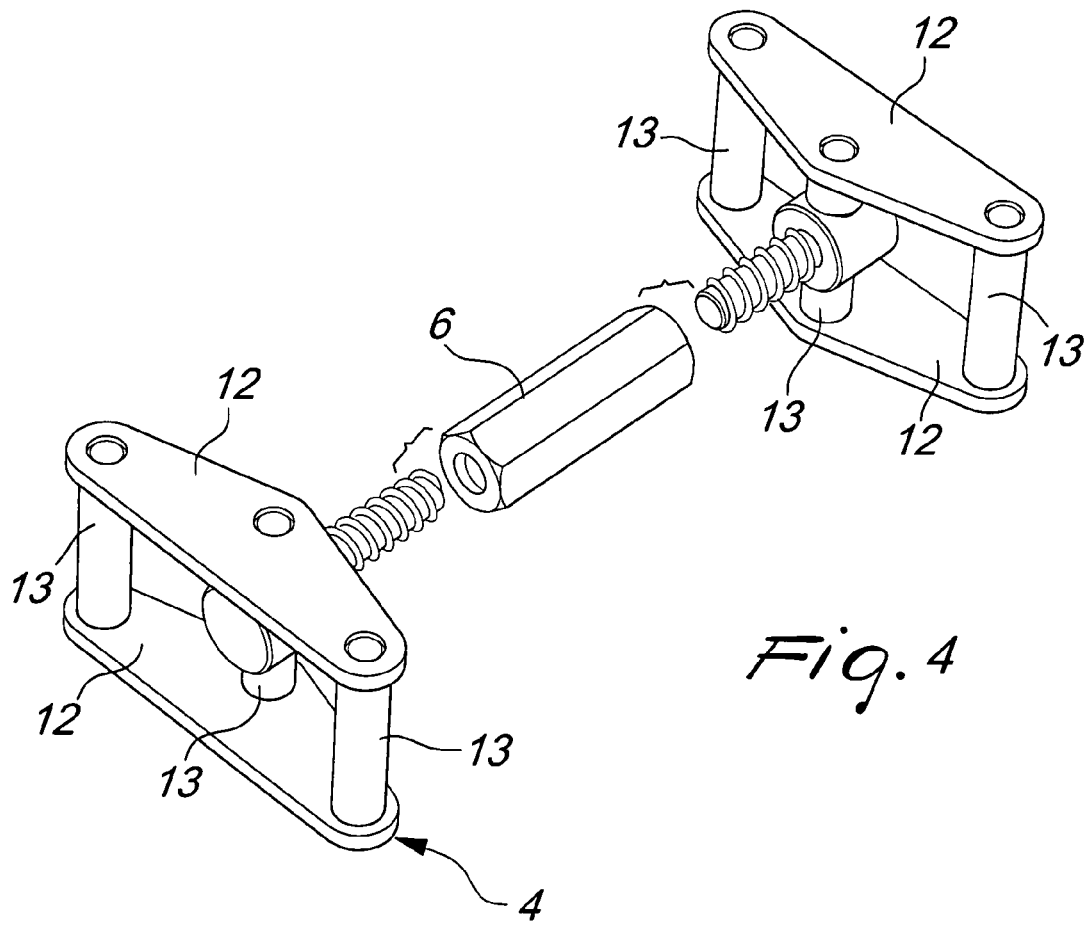
FIG. 4 is an exploded perspective view of the anchoring units of an apparatus for mutually stably connecting profiled elements according to the invention.
Figure 5:
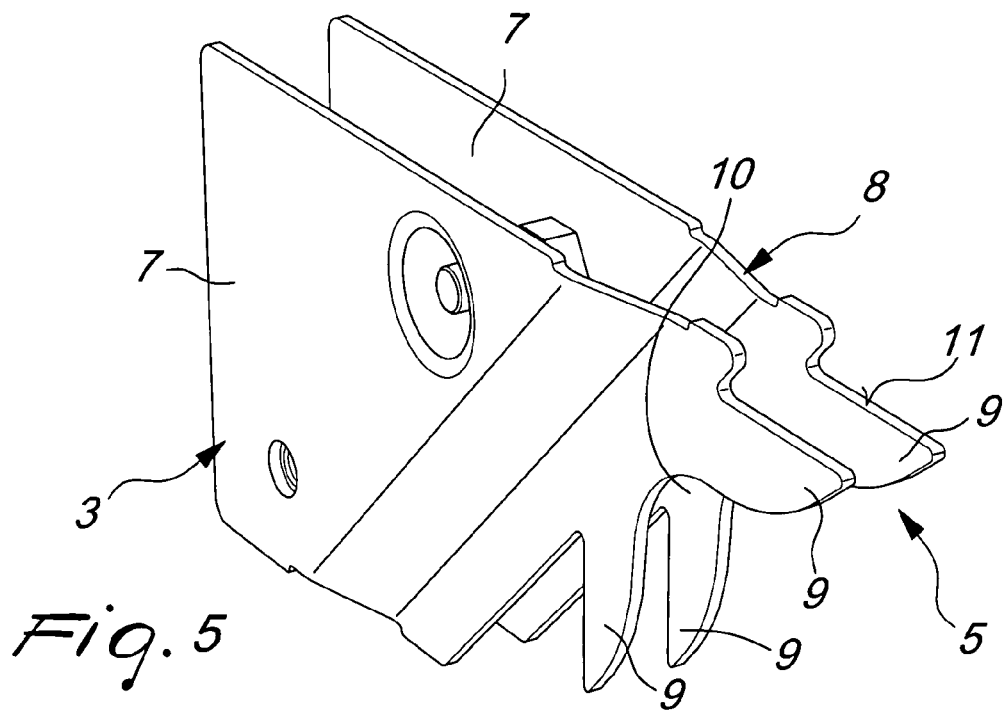
FIG. 5 is a perspective view of an insert of an apparatus for mutually stably connecting profiled elements according to the invention.

With reference to the figures, the reference numeral 1 generally designates an apparatus for mutually stably connecting profiled elements 2.

The apparatus 1 comprises inserts 3, which are suitable for stably accommodating, each within a respective profiled element 2, anchoring units 4 for anchoring to contoured ends 5 of the inserts 3 (each contoured end 5 is directed toward the outside of the respective profiled element 2), and a tension member 6 whose ends are associated with the units 4.

In particular, each insert 3 comprises at least one plate-like body 7, whose width is complementary to the width of the accommodation internal cavity of the profiled element 2 that will accommodate it. In the body 7, an end 8 adapted to be directed outward is substantially inclined with respect to the longitudinal direction of the body 7 and is provided with appropriate contoured portions 5 (also referenced as contoured ends 5). According to an embodiment of particular practical interest, at and proximate to the end 8, the insert has a deviation with respect to the plane on which it lies, so that the end 8 lies on a second plane which is parallel to the preceding one. This solution is of particular interest in application when the inserts 3 are coupled in pairs in the respective profiled element 2.

For optimum efficiency of the apparatus 1, the inserts 3 are in fact two for each profiled element 2, are superimposed, and each has a surface in contact with a respective internal surface of the profiled element 2: the deviation with respect to the plane therefore entails a mutual approach of the two ends 8, which therefore do not interfere with said profiled element, facilitating the assembly operations.

For correct and stable coupling, a layer of adhesive material is interposed between the internal surface of the profiled element 2 and the surface that rests thereon of each insert 3: since metallic parts are generally involved, it is convenient to use specific bonding agents, and possible applications using different materials, such as, purely by way of example, wood, polymeric and/or composite materials, are not excluded.

According to an embodiment of particular practical interest, suitable plates (not shown in the figures) are arranged between the facing surfaces of the inserts 3, whose opposite faces rest against respective internal surfaces of the respective profiled element 2, and are at least as thick as the free height in the cavity of the profiled element 2 in order to force the inserts 3 against the contact surfaces. In this manner, the layer of adhesive material is only an "additional safety", since the connection is ensured by the interlocking and friction coupling of the inserts forced against the internal surfaces of the profiled element 2. The plates can also comprise a fixed base and a movable head which can be actuated by way of a screw (or equivalent element) so that they are inserted between the inserts and then forced to open by way of said screw, increasing their thickness.

The contoured ends 5 comprise two protruding lugs 9, which are separated by a concavity 10 which has a substantially circular shape; the surfaces 11 of the lugs 9 that lie opposite the ones formed by the concavity 10 are substantially inclined and converge in an overall V-shaped configuration. In practice, the lugs 9 diverge and their width is variable, since they are delimited by substantially linear portions on the outside (surfaces 11) and by a substantially circular portion on the inside (concavities 10).

Each anchoring unit 4 comprises two plates 12 which face each other in a parallel configuration and between which perpendicular stems 13 are interposed which are firmly engaged on both of the respective plates 12.

According to an embodiment of particular practical interest, the plates 12 are substantially triangular and the stems 13 are three, engaged proximate to the vertices of the plates 12.

The tension member 6 comprises respective end engagement elements, each adapted to mate with a respective stem 13 of a respective anchoring unit 4. The other stems 13 (the two stems of each unit 4 which are not engaged with the element of the tension member 6) rest against the lugs 9 of the contoured surfaces 5 of the inserts 3.

The tension member 6 comprises a clamping means which is interposed between the engagement elements and whose movement entails the mutual approach and spacing of the engagement elements (with consequent mutual approach and spacing of the units 4 which are connected thereto and therefore also of the mutually coupled inserts 3).

The profiled elements 2 are provided with a substantially circular end recess 14, which faces and is aligned with the concavities 10 of the contoured surfaces 5: the facing arrangement and alignment refer to the configuration in which the profiled elements 2 are coupled with their end edges in mutual contact.

The recess 14 is designed to allow the access of the tool intended to move the clamping means for adjusting the tension member 6. The apparatus 1 therefore provides for the preliminary fitting of the inserts 3 within the respective profiled elements 2, which must be coupled at an angle of incidence for which they are already contoured appropriately (or the fitter will have to provide the inclined cuts at the ends of the profiled elements 2 and provide the recess 14). Assembly can occur by using only adhesive material or, more appropriately, the plates described earlier, which can be fixed or expansible.

By moving the profiled elements 2 mutually closer, it is possible to arrange the units 4 so that each one has a stem 13 which rests against the surface 11 of a lug 9 of an insert which is rigidly coupled to the first profiled element 2, a stem which rests on the same surface 11 related to the other profiled element 2, and the third stem 13 which faces the recess 14 (and the concavities 10).

The tension member 6 is arranged between the "third" stems 13, and its actuation entails the mutual approach of the units 4, which by acting on the inclined surfaces 11 also entails the mutual approach of the profiled elements 2 (rigidly coupled to the respective inserts 3) until the converging surfaces are perfectly mated. As an alternative, it is possible to perform screwing first, taking care to leave the tension member 6 very loose. Once insertion has occurred, tightening is performed.

Each of the "third stem 13" having a male threaded member extending perpendicularly therefrom; the tension member 6 has two opposite ends, each opposite end having an opening therein, each of the openings receiving one of the male threaded members to operate as a turnbuckle therewith.

It should be noted that it is possible to associate, transversely with respect to the apparatus 1, respective beams which are designed to support various elements (such as canopies, pergolas, et cetera). Said beams can engage in the circular openings formed by the mating of the two recesses 14 of the profiled elements 2 in contact.

It has thus been shown that the invention achieves the intended aim and objects.

The invention thus conceived is susceptible of numerous modifications and variations, all of which are within the scope of the appended claims.

All the details may further be replaced with other technically equivalent ones.

In the exemplary embodiments shown, individual characteristics, given in relation to specific examples, may actually be interchanged with other different characteristics that exist in other exemplary embodiments.

Moreover, it is noted that anything found to be already known during the patenting process is understood not to be claimed and to be the subject of a disclaimer.

In practice, the materials used, as well as the shapes and dimensions, may be any according to requirements without thereby abandoning the scope of the protection of the appended claims.

The disclosures in Italian Patent Application No. BO2006A000657 from which this application claims priority are incorporated herein by reference.

What is claimed is:

1. An apparatus comprising:
 a pair of profiled elements;
 a pair of inserts, each insert adhesively secured within one of said profiled elements, each insert having a pair of parallel plates shaped to substantially mirror one another, each plate having a contoured end with a pair of protruding lugs and a concavity between said lugs, said pair of lugs extending away from one another at about a right angle to form a substantially V-shape;
 a pair of identical anchoring units, each anchoring unit having a pair of substantially triangular plates held parallel to one another by a set of three perpendicular stems, said stems fastened between respective pairs of vertices of said triangular plates, each set of stems having an inner stem and two outer stems, each inner stem having a male threaded member extending perpendicularly therefrom;
 a tension member having two opposite ends, each opposite end having an opening therein, each of said openings receiving one of said male threaded members to operate as a turnbuckle therewith;
 wherein tightening of said tension member onto said male threaded members draws said anchoring units towards one another clamping said protruding lugs between said outer stems of said anchoring units and fixing said two profiled elements to extend away from each other at a substantially right angle.

2. The apparatus of claim 1, wherein said insert comprises at least one plate-shaped body that has a width being complementary to a width of an accommodation internal cavity of the profiled element, said body having an end adapted to be directed outward which is substantially inclined with respect to a longitudinal direction of said body and is provided wit contoured portions.

3. The apparatus of claim 2, comprising two said inserts for each profiled element that are superimposed each other, and each has a surface in contact wit a respective contact internal surface of the profiled element.

4. The apparatus of claim 2, comprising a layer of adhesive material that is interposed between a contact internal surface of said profiled element and a surface that rests against said contact internal surface of each of said inserts.

5. The apparatus of claim 4, comprising plates that are arranged between facing surfaces of said inserts, opposite faces of said inserts resting against respective said internal surfaces of said profiled element, said plates having a thickness being at least equal to a free height in said accommodation cavity of the profiled element in order to force said inserts against the contact internal surfaces of the profiled element.

6. The apparatus of claim 1, wherein said concavity that separates the two protruding lugs of said contoured end is a substantially circular concavity, surfaces of said lugs which lie opposite concavity surfaces formed by said concavity being substantially inclined and converging in an overall V-shaped configuration.

7. The apparatus of claim 6, comprising a pair of parallel facing plates provided at each one of said anchoring units, and perpendicular stems interposed between said pair of facing plates, said stems being firmly engaged on both of the respective facing plates, said anchoring units being completely comprised within said profiled elements once mating of the profiled elements has occurred.

8. The apparatus of claim 7, wherein said facing plates are substantially Triangular and said stems are three and engaged proximate to vertices of said facing plates.

9. The apparatus of claim 7, wherein said anchoring units are provided each with a plurality of said stems, said tension member comprising respective end engagement elements, each adapted to mate with a respective said stem of a respective anchoring unit, the other stems of said plurality of stems of a respective anchoring unit resting against said lugs of said contoured surfaces of said inserts.

10. The apparatus of claim 9, wherein said tension member comprises a clamping means which is interposed between said end engagement elements, so that movement of said clamping means entails a mutual approach and spacing of said end engagement elements.

11. The apparatus of claim 10, wherein each one of said profiled elements comprises a substantially circular end recess, which faces and is aligned with said circular concavity of said contoured ends when the profiled elements are mated, in order to allow access of a tool intended to move said clamping means to adjust the tension member.

* * * * *